(12) United States Patent
Yamamoto

(10) Patent No.: US 7,966,508 B2
(45) Date of Patent: Jun. 21, 2011

(54) MODE-SWITCHING SYSTEM AND CAMERA

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 545 days.

(21) Appl. No.: 12/192,322

(22) Filed: Aug. 15, 2008

(65) Prior Publication Data

US 2009/0055670 A1 Feb. 26, 2009

(30) Foreign Application Priority Data

Aug. 23, 2007 (JP) ................................ 2007-217171

(51) Int. Cl.
*G06F 1/32* (2006.01)
(52) U.S. Cl. ......... 713/323; 713/322; 396/302; 396/303
(58) Field of Classification Search .................. 713/322, 713/323; 396/302, 303
See application file for complete search history.

(56) References Cited

U.S. PATENT DOCUMENTS

| 5,255,046 | A | 10/1993 | Kawasaki et al. | |
|---|---|---|---|---|
| 7,843,610 | B2 * | 11/2010 | Hoshi | 358/474 |
| 2002/0114623 | A1 * | 8/2002 | Uenaka | 396/55 |
| 2007/0132873 | A1 * | 6/2007 | Hyodo | 348/333.01 |
| 2007/0195170 | A1 | 8/2007 | Yamamoto et al. | |
| 2007/0196083 | A1 | 8/2007 | Yamamoto et al. | |
| 2008/0197191 | A1 * | 8/2008 | Watanabe et al. | 235/382 |

FOREIGN PATENT DOCUMENTS

| JP | 2000-039645 | 7/1998 |
|---|---|---|
| JP | 2007-279553 | 4/2006 |

OTHER PUBLICATIONS

English language Abstract and machine translation of JP 2000-039645, Jul. 24, 1998.
English language Abstract and machine translation of JP 2007-279553, Apr. 11, 2006.

* cited by examiner

*Primary Examiner* — Thuan N Du
(74) *Attorney, Agent, or Firm* — Greenblum & Bernstein, P.L.C.

(57) ABSTRACT

A mode-switching system, comprising plural switches, a timer, and a controller, is provided. The mode-switching system switches an operation mode of a first unit to one of normal and power-saving modes. The plural switches separately correspond to plural specific functions. Each of the specific functions is carried out when the corresponding switch is switched on. The timer clocks the elapsed time since the switching operation is carried out for any of the switches. The controller switches the operation mode to the power-saving mode from the normal mode when the elapsed time exceeds a threshold value determined for the switch for which the latest switching operation has been carried out. The threshold value is determined individually for each of the switches.

7 Claims, 3 Drawing Sheets

MODE-SWITCHING SYSTEM AND CAMERA

BACKGROUND OF THE INVENTION

1. Field of the Invention

The present invention relates to a mode-switching system that switches an operation mode of a unit, such as a camera, to one of a normal and power-saving modes.

2. Description of the Related Art

Various electric apparatuses which can carry out power-related functions are known. In particular, a portable apparatus such as a camera, to which a battery supplies power, is provided with a power-saving mode in order to prolong its period of use. Power for driving various components of the portable apparatus is cut back from normal usage in the power-saving mode. There is known an auto switching system, which switches an operation mode to the power-saving mode if no commands are input for a specific period.

Even when a portable apparatus is idle, the auto switching system does not switch an operation mode to the power-saving mode unless no command has been input for a specific period. Japanese Unexamined Patent Publication No. 2000-39645 discloses a camera comprising a detector which detects that the camera strap is taut and an operation mode of the camera is automatically switched to the power-saving mode.

However, an operation mode is not always adequately switched to the power-saving mode because the strap is not always drawn when the camera is idle. In addition, such an invention does not apply to a camera without a strap.

SUMMARY OF THE INVENTION

Therefore, an object of the present invention is to provide a mode-switching system that switches an operation mode of a unit consuming power to power-saving mode with suitable timing.

According to the present invention, a mode-switching system, comprising plural switches, a timer, a reset block, and a controller, is provided. The mode-switching system switches an operation mode of a first unit to one of normal and power-saving modes. The first unit is driven with normal power in the normal mode and with less power in the power-saving mode. The plural switches separately correspond to specific functions. The specific functions are provided to the first unit. Each of the specific functions is carried out when the corresponding switch is switched on. The timer clocks the elapsed time since the switching operation is carried out for any of the switches. The switches are switched on or off by the switching operation. The reset block resets the elapsed time when the switching operation is carried out for any of the switches. The controller switches the operation mode to the power-saving mode from the normal mode when the elapsed time exceeds a threshold value determined for the switch for which the latest switching operation has been carried out. The threshold value is determined individually for each of the switches.

Further, the mode-switching system comprises a setting block. The setting block sets the threshold value individually for each of the switches.

Further, the mode-switching system comprises a renewal block. The renewal block renews the threshold value based on the elapsed time until the switching operation is carried out for one of the switches.

Further, the renewal block renews the threshold value by calculating an average of the threshold value determined before renewal and the elapsed time.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
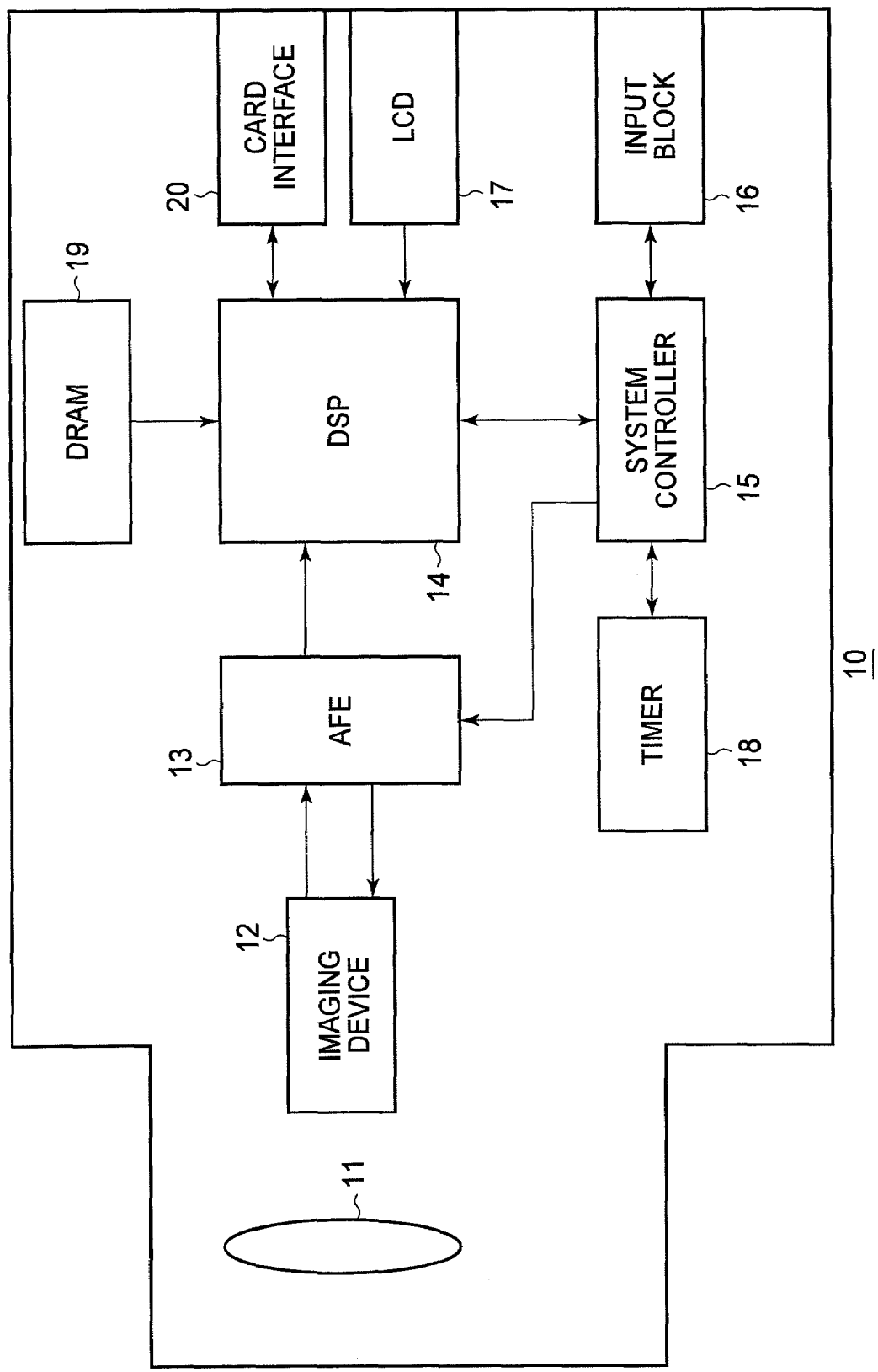
FIG. 1 is a block diagram showing the internal structure of a digital camera having a mode-switching system of an embodiment of the present invention.

The present invention is described below with reference to the embodiment shown in the drawings.

In FIG. 1, a digital camera 10 of the first embodiment comprises a photographic optical system 11, an imaging device 12, an analog front end (AFE) 13, a digital signal processor (DSP) 14, a system controller 15 (controller, reset block, setting block, renewal block), an input block 16, a liquid crystal display (LCD) 17, a timer 18, and other components.

The photographic optical system 11 is optically connected to the imaging device 12. An optical image of an object through the photographic optical system 11 is incident on the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a focusing lens (not depicted) and a zoom lens (not depicted). The focusing lens and the zoom lens are moved by a lens motor (not depicted) along the optical axis of the photographic optical system 11. The lens motor is driven by the motor driver (not depicted).

The imaging device 12 is electrically connected to the DSP 14 via the AFE 13. A clock signal is sent from the DSP 14 to the AFE 13. The AFE 13 drives the imaging device 12 based on the received clock signal to generate an image signal.

The generated image signal is sent to the AFE 13. The AFE 14 carries out correlated double sampling and gain adjustment on the image signal. In addition, the image signal is converted into digital image data and then sent to the DSP 14.

The DSP 14 is connected to a dynamic random access memory (DRAM) 19, which is used as a work memory for data processing. The image data received by the DSP 14 is temporarily stored in the DRAM 18. The DSP 14 carries out predetermined data processing on the image data stored in the DRAM 18.

The DSP 14 is connected to the LCD 17. The image data, having undergone predetermined data processing, is sent to the LCD 17. An image, corresponding to the image data received by the LCD 17 can thereby be displayed on the LCD 17.

The DSP 14 is connected to a card interface 20. When a release operation is carried out, the image data, having undergone predetermined data processing, is stored in a memory card (not depicted) which is connected to the card interface 20.

The DSP 14 is connected to the system controller 15. The system controller 15 controls each component including the DSP 14 of the digital camera 10. The system controller 15 is connected to the input block 16 where a user inputs operational commands for handling the digital camera 10. The input block 16 comprises a release button (not depicted), a multi-functional cross-key (not depicted), a power button, a replay button, and other buttons (plural switches).

When depressing the button which the input block 16 comprises, a predetermined function corresponding to the depressed button starts to be carried out. In addition, when depressing the button, power-saving mode is switched to normal mode or normal mode is continued, as described later. In addition, when depressing the button, the timer 18 starts to clock the elapsed time since the button is depressed.

The digital camera is provided with normal mode and power-saving mode. In the normal mode, each component of the digital camera 10 is driven with enough power to be used comfortably. In the power-saving mode, each component is driven with less power than in the normal mode.

For example, in the power-saving mode, the imaging device 12 is driven based on a frequency of the clock signal adjusted to be lower than in the normal mode when standing by for release. By driving the imaging device 12 based on a low-frequency clock signal, the motion resolution of a real-time image displayed on the LCD 16 is reduced, but power consumption can also be reduced.

In addition, in the power-saving mode, an image is displayed on the LCD 17 more darkly than in the normal mode. By lowering the brightness of the LCD 17, although the image displayed on the LCD 17 gets dark, power consumption can be reduced.

The system controller 15 automatically switches an operation mode of the digital camera 10 between the normal mode and the power-saving mode, as explained below.

Soon after the digital camera 10 is switched on by depressing the power button, each component of the digital camera 10 is driven in the normal mode. If no commands are input to the input block 16 during 20 seconds after switching on the digital camera 10, the normal mode is switched to the power-saving mode.

When a command is input to the input block 16 (except for the power button after switching to the power-saving mode), the power-saving mode is returned to the normal mode. In addition, the system controller 15 resets the clocked elapsed time to zero, and the system controller 15 orders the timer 18 to start clocking the elapsed time again. If no commands are input to the input block 16 for 5 seconds after input to the input block 16, the normal mode is switched to the power-saving mode again. Similarly, after that, when a command is input to the input block 16 (except for the power button after switching to the power-saving mode), the power-saving mode is returned to the normal mode.

The user can change the period during which the operation mode is switched to the power-saving mode, after the digital camera 10 is switched on and a command is input to the input block 16. In addition, the period can be individually determined for each of buttons of the input block 16.

Figure 2:
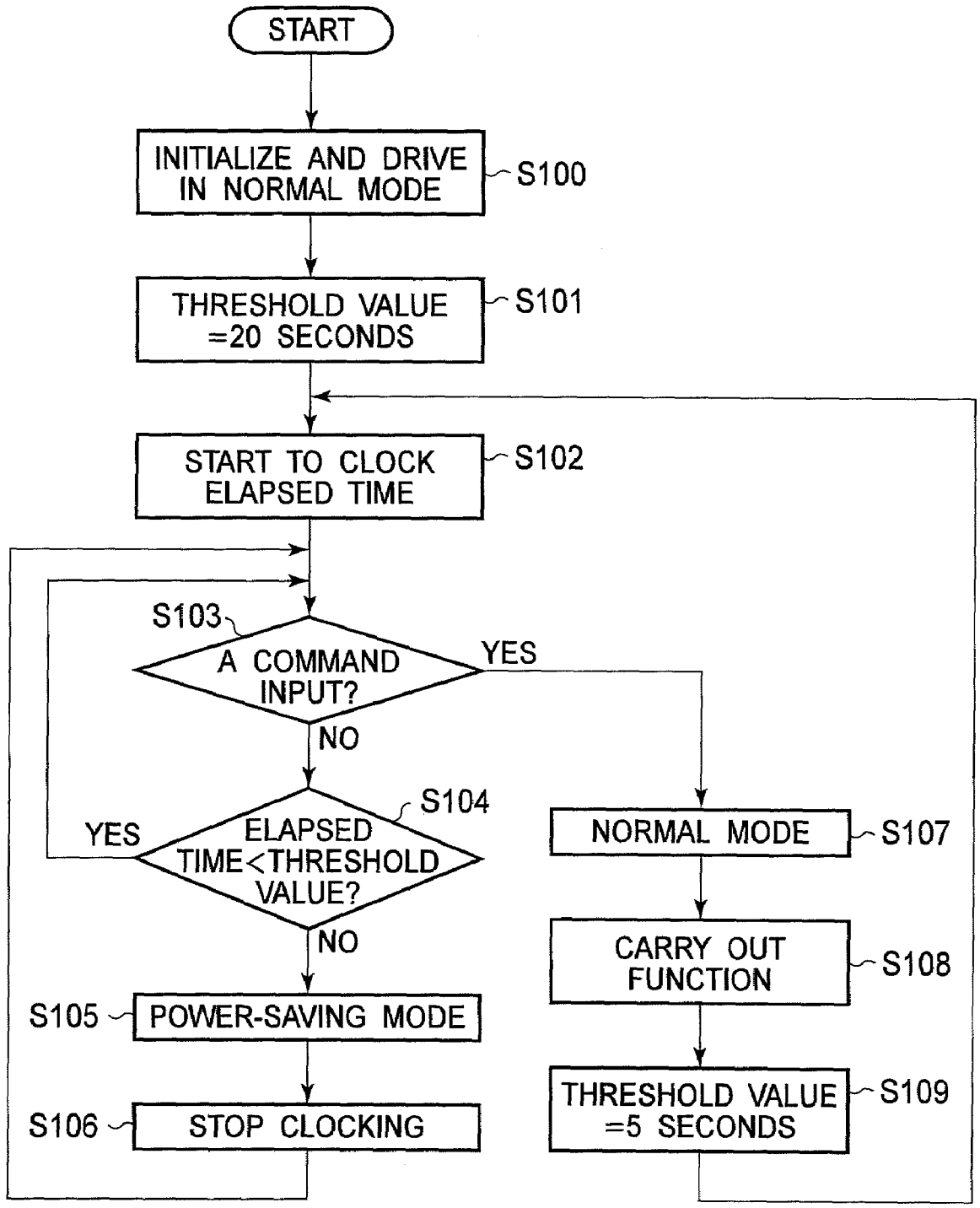
FIG. 2 is a flowchart illustrating the process of switching an operation mode in the first embodiment.

Next, the processes of switching between the normal mode and the power-saving mode, carried out by the system controller 15 in the first embodiment, are explained using the flowchart of FIG. 2. FIG. 2 is a flowchart illustrating the process of switching an operation mode in the first embodiment.

The process of switching an operation mode commences when the digital camera 10 is switched on. And the process is repeated until the digital camera 10 is switched off.

At step S100, each component of the digital camera 10 is initialized. For example, the location of each lens of the photographic optical system 11 is adjusted and the imaging device 12 is initialized. In addition, the system controller 15 orders the driving of the digital camera 10 in the normal mode. After completion of the initialization, the process proceeds to step S101.

At step S101, the threshold value for switching is set to 20 seconds. At the following step S102, the timer 18 is ordered to reset the elapsed time to zero, and then to restart clocking the elapsed time. After starting to clock, the process proceeds to step S103.

At step S103, it is determined whether or not there has been an input of a command to the input block 16. If no command has been input, the process proceeds to step S104. On the other hand, if a command is input, the process proceeds to step S107.

At step S104, it is determined whether or not the elapsed time clocked by the timer 18 is less than the threshold value for switching. If the elapsed time is less than the threshold value for switching, the process returns to step S103. On the other hand, if the elapsed time is more than the threshold value for switching, the process proceeds to step S105.

At step S105, the normal mode is switched to the power-saving mode. At the following step S106, the timer 18 is ordered to stop clocking the elapsed time. After clocking has been stopped, the process returns to step S103.

As described above, if a command is input to the input block 16 at step S103, the process proceeds to step S107. At step S107, the digital camera 10 is ordered to be driven in the normal mode. If the digital camera 10 was being driven in the normal mode before step S107, the normal mode is continued. If the digital camera 10 was driven in the power-saving mode before step S107, the power-saving mode is switched to the normal mode.

At the following step S108, a function corresponding to the button to which a command was input at step S103 starts to be carried out. After starting to carry out the function, the process proceeds to step S109. At step S109, the threshold value for switching is changed to 5 seconds. After changing the threshold value, the process proceeds to step S103.

In the first embodiment above, the operation mode of the digital camera 10 is switched to the power-saving mode at an adequate time. The effect is explained below comparing with a prior camera having the normal mode and the power-saving mode.

In the prior camera, the normal mode is switched to the power-saving mode when the elapsed time exceeds a fixed period after a command is input to the any buttons. Generally, an expected period from depressing a button to next depressing a button varies according to the kind of a previously depressed button. Accordingly, in the prior camera, the fixed period is long for some buttons; on the other hand, short for other buttons.

In the first embodiment above, the periods, during which the normal mode is continued after depressing any buttons, are individually predetermined for each buttons of the input block 16. For example, soon after the power button is depressed and the digital camera 10 is switched on, the digital camera 10 often becomes under a condition of standing by for release. Under the condition of standing by for release, it takes a little long time for a user to catch an object in a finder of the camera 10. Accordingly, under the condition of standing by for release, it is desired driving in the normal mode for long time. On the other hand, after user's setting the digital camera 10 or moving the zoom lens, it is expected that another command to order to carry out another function is immediately input to the input block 16. Accordingly, if a short time is passed without any commands input after user's setting the digital camera 10 or moving the zoom lens, immediately the normal mode is switched to the power saving mode. In addition, the period, during which the normal mode is continued after depressing each of buttons, is adequately adjustable for each buttons of the input block 16.

Next, a camera having a mode-switching system of the second embodiment is explained. The primary difference between the second embodiment and the first embodiment is a method to determine a threshold value for switching. The second embodiment is explained mainly with reference to the structures that differ from those of the first embodiment. Here, the same index numbers are used for the structures that correspond to those of the first embodiment.

The system controller 15 automatically switches an operation mode of the digital camera 10 to one of the normal mode and the power saving mode, in the same as the first embodiment.

Soon after the digital camera 10 is switched on by depressing the power button, each component of the digital camera 10 is driven in the normal mode. If no commands are input to the input block 16 for the period equivalent to the threshold value for switching after switching on the digital camera 10, the normal mode is switched to the power-saving mode, similar to the first embodiment. The system controller 15 reads a threshold value memorized in flash memory (not depicted). The threshold value for switching is set based on the memorized threshold value, and renewed according to the usage of the digital camera 10, as explained below. The memorized threshold value is 180 seconds on manufacturing.

If no commands are input to the input block 16 during 180 seconds after the digital camera 10 is switched on, the normal mode is switched to the power-saving mode.

When a command is input to the input block 16 after switching to the power-saving mode, the power-saving mode is returned to the normal mode. Then, the elapsed time until a command is newly input to the input block 16 and the threshold value for switching are averaged, and the threshold value for switching memorized in the flash memory is renewed with the calculated average, different from the first embodiment.

After renewal of the threshold value for switching, the clocked elapsed time is reset to zero, and the timer 18 starts to clock the elapsed time again. If no commands are input to the input block 16 during the period equivalent to the renewed threshold value for switching after previous inputting to the input block 16, the normal mode is switched to the power-saving mode again. After then, similarly, when a command is input to the input block 16 after switching to the power-saving mode, the power-saving mode is returned to the normal mode and the threshold value for switching is renewed.

Figure 3:
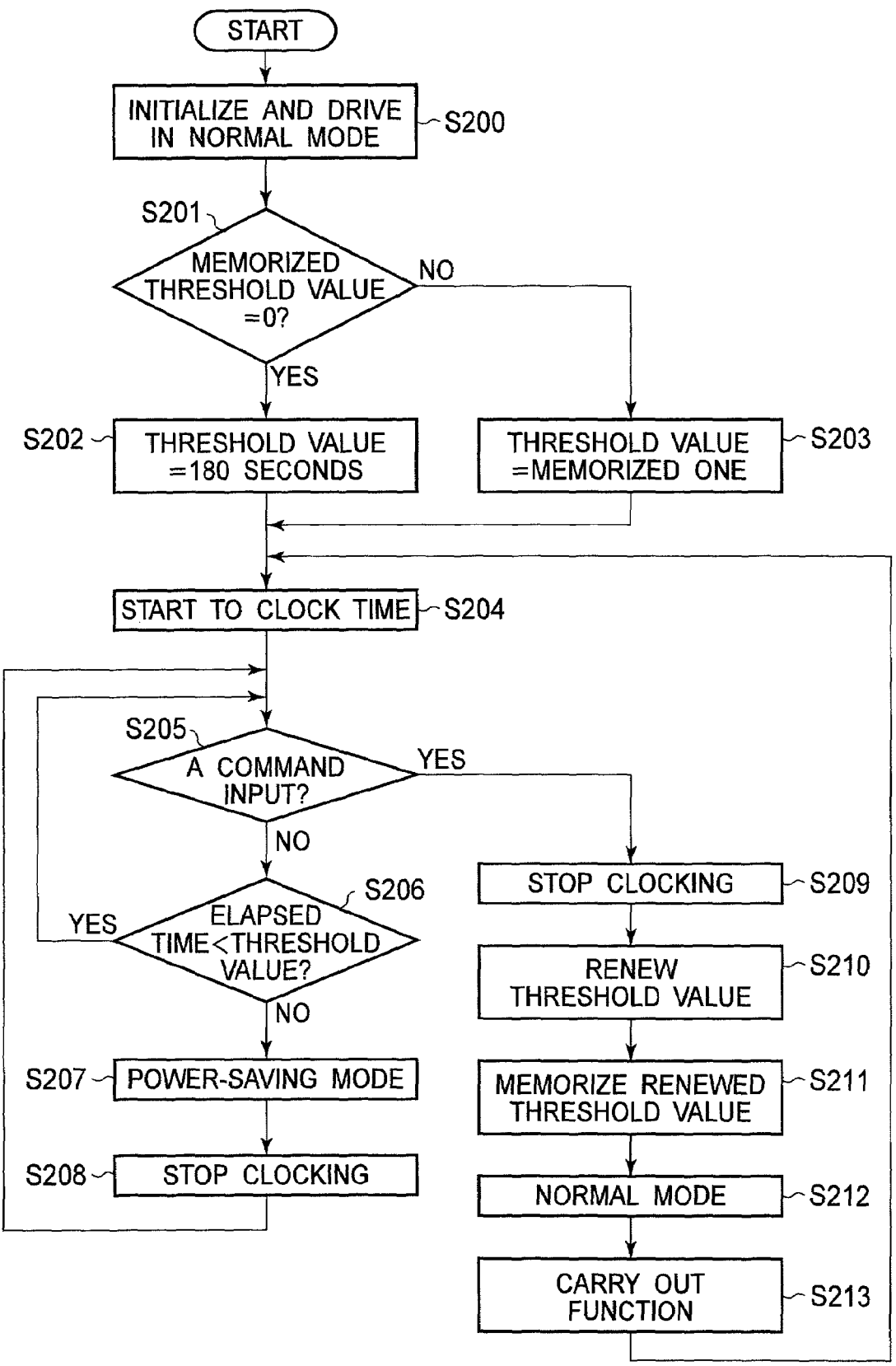
FIG. 3 is a flowchart illustrating the process of switching an operation mode in the second embodiment.

Next, the processes of switching between the normal mode and the power-saving mode, carried out by the system controller 16 in the second embodiment, are explained using the flowcharts of FIG. 3. FIG. 3 is a flowchart illustrating the process of switching an operation mode in the second embodiment.

The process of switching an operation mode commences when the digital camera 10 is switched on. And the process is repeated until the digital camera 10 is switched off.

At step S200, each component of the digital camera 10 is initialized. For example, the location of each lens of the photographic optical system 11 is adjusted and the imaging device 12 is initialized. In addition, the system controller 15 orders to drive the digital camera 10 in the normal mode. After completion of the initialization, the process proceeds to step S201.

At step S201, the threshold value memorized in the flash memory is read out. In addition, it is determined whether or not the memorized threshold value is zero. If the memorized threshold value is zero, the process proceeds to step S202, where the threshold value for switching is determined to 180 seconds. On the other hand, the memorized threshold value is not zero, the process proceeds to step S203, where the threshold value for switching is determined to the memorized threshold value.

After completion of determining the threshold value for switching, the process proceeds to step S204. At step S204, the timer 18 is ordered to reset the elapsed time to zero, and then to restart clocking the elapsed time. After starting to clock, the process proceeds to step S205.

At step S205, it is determined whether or not there is an input of a command to the input block 16. If no command is input, the process proceeds to step S206. On the other hand, if a command is input, the process proceeds to step S209.

At step S206, it is determined whether or not the elapsed time clocked by the timer 18 is less than the threshold value for switching. If the elapsed time is less than the threshold value for switching, the process returns to step S205. On the other hand, if the elapsed time is more than the threshold value for switching, the process proceeds to step S207.

At step S207, the normal mode is switched to the power-saving mode. At the following step S208, the timer 18 is ordered to stop clocking the elapsed time. After completion of stopping clocking, the process returns to step S205.

As described above, if a command is input to the input block 16 at step S205, the process proceeds to step S209. At step S209, the timer 18 is ordered to stop clocking the elapsed time. At the following step S210, the threshold value for switching is renewed using the elapsed time clocked until the process proceeds to step S209. A new threshold value for switching is calculated by averaging the previous threshold value for switching and the elapsed time clocked by the timer 18. If the previous threshold value for switching is zero, the elapsed time is set as a renewed threshold value for switching.

After renewal of the threshold value for switching, the process proceeds to step S211. At step S211, the memorized threshold value in the flash memory is replaced with the renewed threshold value for switching and memorized. At the following step S212, the digital camera 10 is ordered to be driven in the normal mode. If the digital camera 10 was being driven in the normal mode before step S212, the normal mode is continued. If the digital camera 10 was driven in the power-saving mode before step S212, the power-saving mode is switched to the normal mode.

At the following step S213, the function corresponding to the button pressed at step S205 starts to be carried out. After starting to carry out the function, the process returns to step S204.

In the second embodiment above, the operation mode of the digital camera 10 is switched to the power-saving mode at an adequate time, as in the first embodiment.

The input block 16 comprises plural buttons, such as a release button and a power button, in the above first and second embodiments. However, the input block can comprise any kinds of input mechanism that works as a switch to carry out a predetermined function of the digital camera 10.

Power consumption of the digital camera in the power saving mode is reduced by lowering the frequency of the clock signal used to drive the imaging device 12 and displaying a darker image on the LCD 17 in the above first and second embodiments. However, power consumption can be reduced by driving a different component with lower power.

The average of the previous threshold value for switching and the elapsed time clocked by the timer 18, is set as the renewed threshold value for switching in the second embodiment. However, a renewed threshold value for switching can be calculated according to any renewal methods using the elapsed time. For example, a minimum time margin may be added to the elapsed time, and the average of the previous threshold value for switching and the added elapsed time can be calculated as the renewed threshold value for switching in order to prevent the renewed threshold value for switching from being too short.

The threshold value for switching is renewed whenever a single command is input to the input block 16 in the second embodiment. However, the threshold value for switching is renewed so that the threshold value for switching may change when commands are input in rapid succession as opposed to singly. For example, the threshold value for switching renewed when a release button is fully depressed successively three times can be shorter than the renewed value when the release button has been fully depressed only once.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2007-217171 (filed on Aug. 23, 2007), which is expressly incorporated herein, by reference, in its entirety.

The invention claimed is:

1. A mode-switching system, said mode-switching system switching an operation mode of a first unit to one of normal and power-saving modes, said first unit being driven with normal power in said normal mode and with less power in said power-saving mode, said mode-switching system comprising:

plural switches that separately correspond to specific functions, said plural specific functions being provided to said first unit, each of said specific functions being carried out when the corresponding switch being switched on;

a timer that clocks an elapsed time since the switching operation is carried out for any of said switches, said switches being switched on or off by said switching operation;

a reset block that resets said elapsed time when said switching operation is carried out for any of said switches; and a controller that switches the operation mode to said power-saving mode from said normal mode when said elapsed time exceeds a threshold value determined for said switch for which said latest switching operation has been carried out, said threshold value being determined individually for each of said switches.

2. The mode-switching system according to claim 1, wherein said threshold value is predetermined individually for each of said switches.

3. The mode-switching system according to claim 1, further comprising a setting block that sets said threshold value individually for each of said switches.

4. The mode-switching system according to claim 1, further comprising a renewal block that renews said threshold value based on said elapsed time until said switching operation is carried out for one of said switches.

5. The mode-switching system according to claim 4, wherein said renewal block renews said threshold value by calculating the average of said threshold value determined before renewal, and said elapsed time.

6. A camera having normal mode and power-saving mode, said camera being driven with normal power in said normal mode and with less power in said power-saving mode, said camera comprising:

plural switches that separately corresponds to specific functions, said plural specific functions as well as a mode-switch function being provided to said camera, each of said specific functions being corresponded to said switches, each of said specific functions being carried out when the corresponding switch being switched on, said operation mode being switched to said power-saving mode by carrying out said mode-switch function;

a timer that clocks an elapsed time since the switching operation is carried out for any of said switches, said switches being switched on or off by said switching operation;

a reset block that resets said elapsed time when said switching operation is carried out for any of said switches; and a controller that switches the operation mode to said power-saving mode from said normal mode when said elapsed time exceeds a threshold value determined for said switch for which said latest switching operation has been carried out, said threshold value being determined individually for each of said switches.

7. The camera according to claim 6, further comprising a renewal block that renews said threshold value based on said elapsed time until said switching operation is carried out for one of said switches.

* * * * *